United States Patent [19]

Dickmann

[11] 3,837,679
[45] Sept. 24, 1974

[54] HITCHING ASSEMBLY FOR HITCHING A TRAILER TO A TOWING VEHICLE

[75] Inventor: Thomas Dickmann, Karlsruhe, Germany

[73] Assignee: PEKA-Fahrzeugbau Eberhardt KG, Karlsruhe, Germany

[22] Filed: Nov. 29, 1972

[21] Appl. No.: 310,401

[30] Foreign Application Priority Data
Nov. 30, 1971 Germany.............................. 2159234

[52] U.S. Cl............... 280/491 E, 172/275, 280/511
[51] Int. Cl........................... B60d 1/16, B60d 1/06
[58] Field of Search.................... 280/491, 495, 511; 172/275

[56] References Cited
UNITED STATES PATENTS

| | | |
|---|---|---|
| 2,113,778 | 4/1938 | Willetts ....................... 280/491 E X |
| 2,639,160 | 5/1953 | Studebaker et al................. 280/495 |
| 3,032,353 | 5/1962 | Williams et al. ................ 280/414 R |

*Primary Examiner*—Leo Friaglia
*Attorney, Agent, or Firm*—Walter Becker

[57] ABSTRACT

A hitching assembly for hitching a trailer to a towing vehicle, especially a passenger car, which comprises a rod provided with a ball at one end and a transverse bore at the other end portion of the rod. The assembly furthermore comprises mounting means attachable to the towing vehicle and comprising a sleeve slidable relative to the said other end of the rod, the sleeve and the rod being respectively provided with mutually complementary abutment means for abutting engagement with each other while an eccentric bolt journaled in cylindrical axially aligned bores of the sleeve has a portion eccentric with regard to said cylindrical bores located in said transverse bore which is eccentric to said cylindrical bores, said eccentric portion being operable when received in said eccentric bores to cause relative displacement of the rod and the sleeve as to lock the same together.

11 Claims, 4 Drawing Figures

HITCHING ASSEMBLY FOR HITCHING A TRAILER TO A TOWING VEHICLE

The invention relates to a ball hitch assembly for hitching a trailer to a towing vehicle.

Several kinds of ball hitch assembly exist, in which a rod provided at its end with a ball and projecting rearwardly from a frame member of a towing vehicle can be removed from its mounting on the vehicle. However, such arrangements are rather complicated in their construction and handling, and may also be found to be subject to rattling and to the effects of play between the components of the assembly.

With arrangements of this type, it is rather difficult simultaneously to meet the various requirements such as the provision of sufficient play to enable the assembly to be demounted when required, and also the provision of fastening means to hold the components together without allowing the play to cause rattling or other undesirable effects. Such play may harmfully affect the traveling characteristics of the towing vehicle, and the occurrence of considerable wear on the components of the assembly caused by the alternate application of tension and compression forces on the assembly as the towing vehicle accelerates and brakes respectively.

It is, therefore, an object of this invention to provide a hitching device which is easy to handle, is play-free and will not rattle while it will be safe in operation.

These and other objects and advantages of the invention will appear more clearly from the following specification in connection with the accompanying drawings, in which.

It is proposed according to the present invention that the assembly should include fastening means selectable operable to apply stress to a rod provided to be connected to a trailer, in such a manner as to maintain mutually complementary surfaces of discrete members of the assembly in resilient abutment to alleviate the undesired effects of play of the rod while the assembly is in its fastened condition. The stress is preferably either tensile or compressive stress.

According to one aspect of the present invention, there is provided a ball hitch assembly for hitching a trailer to a towing vehicle, comprising a rod provided with a ball at one end, mounting means attachable to such towing vehicle and comprising a sleeve, which is open at least at one end for entry of the opposite end of the rod and which is slidable relatively to the rod, the sleeve and the rod being respectively provided with mutually complementary abutment surfaces. Furthermore, fastening means are provided to retain the abutment surfaces in mutual abutment, the fastening means comprising a pin, which is receivable in mutually alignable apertures of the sleeve and the rod respectively and which has an eccentric portion so arranged as to enable the pin — when received in the apertures — on being rotated to cause relative displacement of the rod and the sleeve, at least one of the abutment surfaces being provided on resiliently yieldable material.

The abutment surface of the rod may be provided by a ring of resiliently yieldable material mounted to be urged against the abutment surface of the sleeve by a shoulder on the rod.

Figure 1:
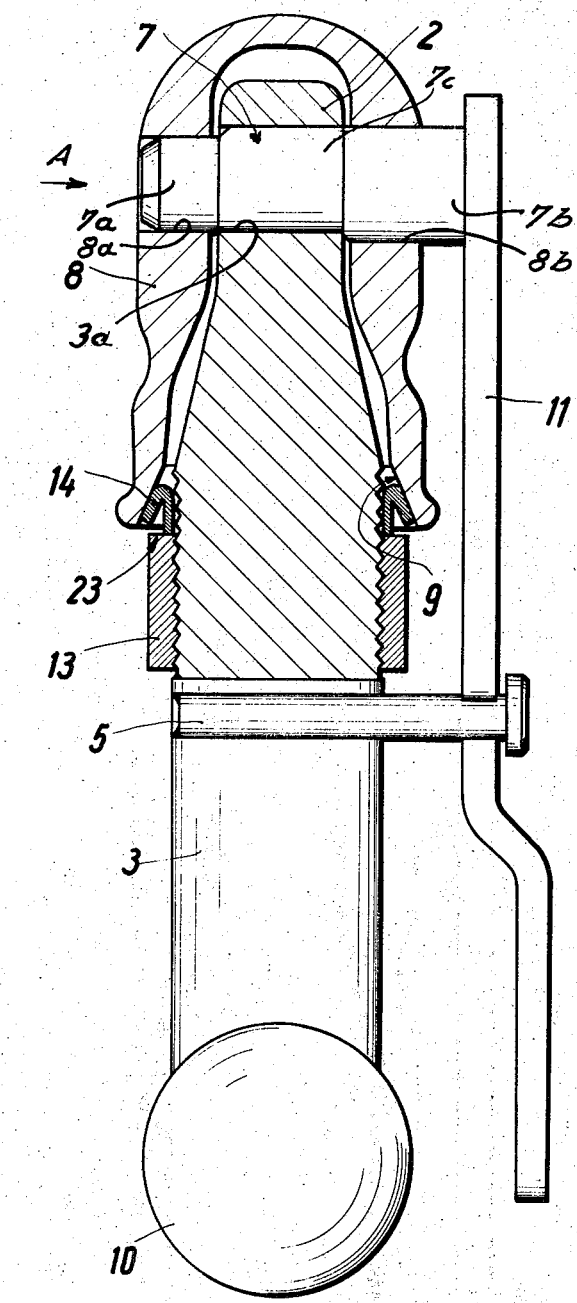
FIG. 1 shows in plan view and partly in section a first embodiment of a ball hitch assembly according to the invention.

Referring now to the drawings in detail and FIG. 1 thereof in particular, the hitching device illustrated therein comprises a rod 3, the lower end of which is provided with a ball 10, from which rises the main body portion of the rod, which decreases in width towards the top end. A central portion of the main body portion is screw threaded and engaged by a nut 13 with a shoulder 23 at its top end. A dish spring 14 of resiliently yieldable material engages with one of its arms the shoulder 23 and with another arm engages a frustoconical annular surface portion of an enlargement of a sleeve 8 which receives the upper end of the rod 3. The sleeve 8 is closed at its top end and open at its lower end. An arresting bolt 5 engages the rod 3 to arrest a manually operable lever 11 connected to an eccentric pin 7. Pin or bolt 7 has three portions, namely two spaced outer portions 7a, 7b which are coaxial with one another and an intermediate portion, designated with reference numeral 7c, which is eccentrically disposed relatively to the outer portions 7a, 7b and which has a diameter greater than that of portion 7a, but less than that of portions 7b. The eccentricity of the intermediate portion 7c is the same as compared with either one of the two respective outer portions 7a, 7b, and the difference in radius between the intermediate portion and the two respective outer portions is in each case equal to the eccentricity of the intermediate portion. As a result of this configuration, when the pin 7 is viewed in the direction of the arrow "A," there is one peripheral location at which the circle denoting the cross section of the smaller outer portion 7a is tangential to the circle denoting the cross section of the eccentric intermediate portion 7c. The same considerations apply to the eccentric intermediate portion 7c and the larger outer portion 7b. The sleeve 8 is an integral cast sleeve, but if desired this may be replaced by a tubular sleeve 1 to be described later with reference to other embodiments.

In the position shown in FIG. 1, the assembly is shown ready for use to tow a caravan or other such vehicle behind a towing vehicle, i.e., in the position in which the rod 3 is firmly clamped and fastened by the fastening means comprising the eccentric pin 7, so that although the rod 3 is constructed to be slidable with play within the sleeve 8, nevertheless this play does not produce any rattling since relative motion between the rod 3 and the sleeve 8 is prevented by the pin 7 in cooperation with the spring 14. To reach the condition shown in FIG. 1, the sleeve 8 is located over the end of the rod 3, with the spring 14 in position, the eccentric pin 7 is inserted into axially aligned apertures 8a, 8b in the sleeve 8 and through bore 3a in rod 3. Lever 11 is then employed to rotate the eccentric pin 7 to draw the rod 3 into the sleeve 8 and thereby to compress the spring 14 against the shoulder 23. The nut 13 having the shoulder 23 provided thereon constitutes adjusting means to adjust the position of the spring 14 in a direction parallel to the longitudinal axis of the rod 3. The annular surface forming a seating for the spring 14 is shown at 9. In use, pulling forces acting in the direction of the longitudinal axis of the rod 3 are transferred to the ball 10 without further elastic elements via the sleeve 8, the eccentric pin 7 having the eccentric portion 7c, and the rod 3. Forces acting on the ball 10 in the longitudinal direction or transversely to this direction are taken up and elastically damped by the dish spring 14.

The threaded nut 13 can be moved axially along the rod 3 by rotation thereof relative to the rod 3 to adjust the tension on the eccentric pin 7. Such adjustment may be found to be necessary, in particular where relatively stiff material is used for the components, for example for the dish spring 14.

It is clear that if the sleeve 8 becomes dirty or rusty, the operation of the assembly is affected hardly at all, nor is the insertion of the end portion 2 of the rod 3 into the sleeve 8 impeded. For operational purposes, the only factor, which for practical purposes is of decisive importance, is the tension applied by the eccentric pin 7 to the portion 2 of the rod 3, acting between the portion 2 and the seating 9 in the sleeve 8. This tension assures the secure seating of the rod 3 in the sleeve 8 and also permits the possibility of taking up the different tension and compression forces which act on the ball 10 of the rod 3.

Figure 2:
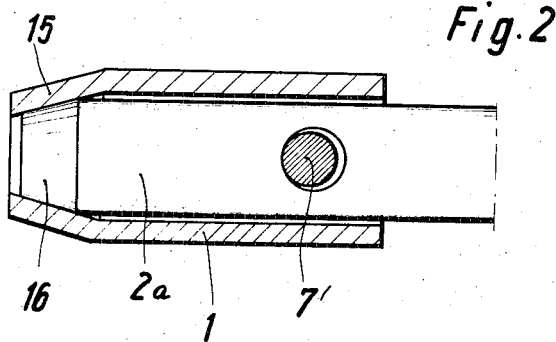
FIG. 2 illustrates a detail section of a modified embodiment of a hitching device according to the invention.

A modified embodiment is shown in FIG. 2, in which a tubular sleeve open at both ends and indicated at 1 replaces the sleeve 8 of the first embodiment and is provided with a frusto-conical end portion 15. A seating in the form of a frusto-cone 16 is provided at that end portion of rod 2a which is adjacent the end 15 of sleeve 1, the portions 15 and 16 constituting abutment surfaces which again can be retained in resilient mutual abutment by an eccentric pin 7'. Thus a secure connection between the rod and the sleeve 1 is obtained.

Figure 3:
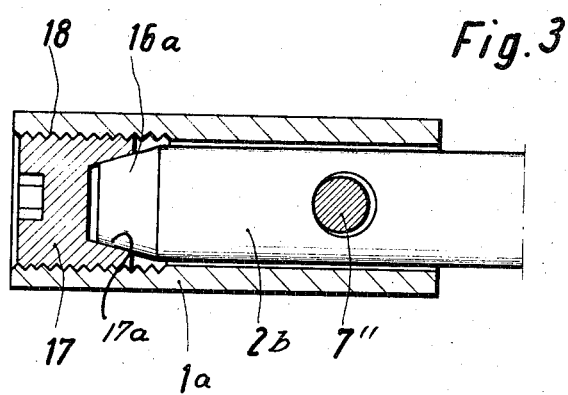
FIG. 3 shows a detailed section of a further modified embodiment of the invention.

FIG. 3 shows a detail of a further modified embodiment, which is provided with adjusting means in the form of an adjustable threaded plug 17 having formed therein a conical seating surface 17a for the frusto-conical end 16a of shaft 2b. Again in this embodiment the fastening means comprises an eccentric pin shown at 7''. By screwing the threaded plug 17 axially along the sleeve 1a, i.e., by rotating the plug 17, the forces acting between the conical seating surface 17a of the plug 17 and the rod portion 16a can be varied. This may be found to be of advantage in particular when a seating and a corresponding cooperating surface are to be provided both at the end of the sleeve through which the rod is inserted and also at the opposite end of the sleeve. Such an arrangement may be employed to secure the sleeve and rod at a total of three places — two end cone connections and a fastening device for retaining the cone connections in their firm condition.

Figure 4:
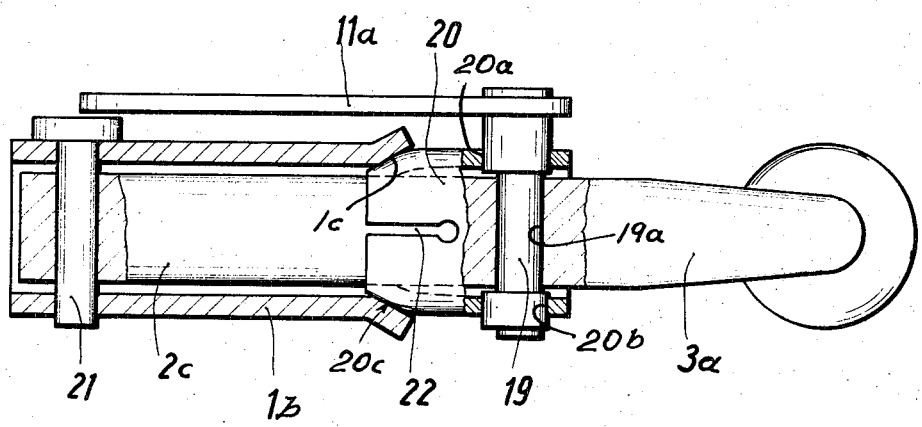
FIG. 4 shows in plan view and partly in section still another embodiment of the invention.

FIG. 4 shows another embodiment, which has a rod 3a, and also has a first sleeve 1b and a second sleeve 20. A pin 21 extending through alignable apertures in the first sleeve 1b and the portion 2c of the rod 3a constitutes selectable retaining means to retain the first sleeve 1b against sliding relative to the rod 3a. Both the first sleeve 1b and the second sleeve 20 are otherwise constructed to be freely slidable relative to the rod 3a. An eccentric pin 19 passes through aligned apertures 20a, 20b in the second sleeve 20 and through opening 19a of the rod 3a, and acts, in a similar manner to that described with reference to FIGS. 1 to 3, to retain an external frusto-conical abutment surface 20c of the second sleeve 20 in abutment with an internal frusto-conical abutment surface 1c of the first sleeve 1b. A manually operable lever 11a is connected to the eccentric pin 19 to turn the latter, the arrangement being such that in the locked condition of the assembly one end of the lever 11a lies over the head of pin 21, to prevent the pin 21 from falling out or otherwise being accidentally removed from its aligned apertures in the rod and the first sleeve 1b. The sleeve 20 is chamfered at its end surface 20c and adapted to the configuration of the end surface 1c of the sleeve 1b. A number of slots 22 are provided in the annular wall of the sleeve 20, to enhance the resilience of the material of the sleeve 20. As the lever 11 is pivoted to tighten up the fastening means comprising the eccentric pin 19, the pin 19 passes the sleeve 20 leftwardly with regard to FIG. 4 into firm abutment with the first sleeve 1b. Thus a secure connection between the components of the ball hitch assembly is achieved. By the frusto-conical chamfering of the sleeves 1b and 20, it is achieved that, as in the case of the previously described embodiment, a longitudinal and also a transverse force is generated when the pin 19 is tightened. During the return movement of the lever 11a, the sleeve 20 is drawn rightwardly in FIG. 4 out of the chamfered end portion of the sleeve 1b so that the connection between the rod 3a and the sleeve 1b is loosened. The pin 21, and thereafter the rod 3a can then be removed from the sleeve 1b.

With judicious choice of dimensions, the illustrated embodiments of the ball hitch assembly of the invention may be made simple in their handling characteristics, and also substantially free from play in use and from rattling. They may thus be made safe in operation in traffic.

The degree of resiliency required at least for the one abutment surface mentioned above may be chosen within appropriate limits, generally only a small degree of resiliency being required. Instead of the shoulder 23 provided on a nut, as shown in FIG. 1, such a should may, if desired, be provided on the sleeve.

The rod end with the ball is inserted with play into the sleeve, which in use is welded, bolted or clamped, if desired utilizing intermediate joining elements, to the towing vehicle. Sufficient anchoring of the rod in the sleeve is achieved by pressing the rod into abutment, by its abutment surface, with a complementary abutment surface on a seating, which may be provided on the sleeve. Since generally the high compression and tension forces which occur in use are exerted in the direction of the longitudinal axis of the rod, this manner of securing may under favorable conditions be completely free of play and rattling when the eccentric pin is tightened.

The use of slightly resiliently yieldable material for the abutment surfaces may be found to be advantageous from the point of view of production of the components of the assembly, since otherwise very small tolerances in dimensions would have to be achieved, in order to obtain the desired prestressing of the rod. Where slightly resiliently yieldable material is employed, the tolerances of dimensions which may not be avoided are allowed for by the yieldable material, without thereby affecting the safety of operation to any significant extent. Furthermore, a roughly constant force may be guaranteed during the pivoting of the eccentric pin by the lever, since this force is conditioned by the resiliency of the materials forming the mutually cooperable abutment surfaces.

The yieldable material employed may, for example, be largely creep-free plastics material, or one or more dish springs connected in series to each other. Where plastics material is employed, it may be recommended to construct the plastics surface to be of a crowned shape, to achieve a progressively increasing displacement force characteristic. Of course, the plastics material can be covered over its surface with steel metal, if desired. A particularly simple construction may be achieved by constructing the plastics material to be annular and to be put on to the rod or inserted into the sleeve. In this way, when the plastics material ring shows signs of wear, or its resiliency considerably decreases, it can be exchanged for another one without great difficulty.

When a frusto-conical abutment surface is employed, the shape of this surface also achieves centering of the two components to be pressed into one another as well as good freedom from play and rattling. An alternative arrangement is possible in which the rod grips over the end of the sleeve, instead of being received therein.

By including adjusting means in the ball hitch assembly, production tolerances of the components can be compensated, as well as tolerances in the resilience of the respective abutment surfaces. Where a second sleeve is employed, its abutment surface may be worked on to the sleeve in its manufacture. It is possible to provide an arrangement in which the eccentric pin is securely retained in the ball-ended rod, and in which a second sleeve as described above is employed. In such a case, the rod is secured in the sleeve by a securing pin which is put through aligned apertures in the sleeve and through the rod at the opposite end from the eccentric pin. Subsequently, by displacement of the second sleeve and the resulting pressure acting between the abutment surfaces, the rod is held fast. Expediently, the lever connected to the eccentric pin may be displaced by several angular degrees relatively to the greatest eccentric offsetting of the intermediate portion of the pin so as in the fastened condition of the assembly to lie parallel to the longitudinal axis of the sleeve. By arranging the lever to be displaced womewhat relatively to the greatest eccentric offsetting, it may be arranged that the forces acting on the eccentric pin act against a return rotation of the pin. Where a second sleeve is employed as in the arrangement shown in FIG. 4, it may be of advantage to construct the second sleeve so as to tend to spring radially outwardly under its own resiliency.

It will be apparent from the following that the above described embodiments of ball hitch assembly are very simple in their handling characteristics. To make the assembly ready for use in towing, it is merely necessary to insert the ball-ended rod by its end portion 2 into the sleeve and to tighten up the fastening means by pivoting the lever. Further tightening operations will then not be necessary. The simple mode of production of the various components is also to be noted, and in particular that the manufacture of the sleeve, as well as of the appropriate abutment surfaces, can take place by pressing, as well as by turning.

It is, of course, to be understood that the present invention is, by no means, limited to the specific showing in the drawings, but also comprises any modifications within the scope of the appended claims.

What I claim is:

1. A hitch assembly for hitching a trailer to a towing land vehicle, especially to a passenger car, which includes: a rod having a bore through one end portion thereof and comprising a ball forming the other end portion of said rod, mounting means attachable to a towing vehicle and comprising a sleeve open at least at one end for receiving the other end of said rod, said sleeve being axially movable relative to said rod and being provided with axially aligned cylindrical bores extending transverse to the longitudinal axis of said rod and eccentrically offset with regard to said bore in said one end portion of said rod while communicating therewith, said sleeve and said rod being respectively provided with mutually complementary abutment means for engagement with each other, said complementary abutment means comprising abutment surfaces on said sleeve surrounding complementary abutment surfaces on said rod, said surfaces being inclined to the longitudinal axis of said rod so as to converge along said axis, and fastening means for retaining said mutually complementary abutment means in engagement with each other, said fastening means including an eccentric bolt journaled in said cylindrical bores of said sleeve and having a cylindrical portion eccentric with regard to the bolt portions journaled in said cylindrical portions of said sleeve and journaled in said eccentric bore of said rod, said bolt being rotatable to cause relative displacement of said rod and said sleeve along said longitudinal axis for selectively clamping the same against each other along said abutment means one of said abutment means being formed of a ring of resilient material to engage the complementary abutment means, said eccentric bolt clamping said rod in said sleeve and said abutment surfaces together against said resilient ring to support the rod in said sleeve against both vertical and horizontal forces.

2. An assembly according to claim 1, in which the abutment means of the sleeve is provided by an enlargement of frusto-conical cross section at said one end of the sleeve.

3. An assembly according to claim 1, in which the abutment means of the sleeve is provided by an inner cone of said sleeve and in which the abutment means of said rod is provided by a cone at that end face of the rod which is remote from said ball.

4. An assembly according to claim 1, in which the abutment means of the rod is provided by a ring of resilient yieldable material.

5. An assembly according to claim 1, in which said eccentric bolt comprises two individual outer portions of cylindrical cross section and an intermediate portion of circular cross section arranged eccentrically to be received in said bore of said one end portion of said rod, the magnitude of the radius of the intermediate portion being between the magnitudes of the radii of said two outer portions, and the individual differences between the radius of the intermediate and the radii of the two respective outer portions, each being at least equal to the eccentricity of said intermediate portion.

6. A ball hitch assembly for hitching a trailer to a towing vehicle, comprising a rod provided with a ball at one end, mounting means attachable to such towing vehicle and comprising a first sleeve which is open at least at one end for entry of the opposite end of the rod, a second sleeve which is open at both ends and is provided with two axially aligned transverse bores, the two sleeves being slidable relatively to the rod and being respectively provided with mutually complementary abutment surfaces, and said rod being provided with a transverse aperture which in assembled condition of said rod and said second sleeve is eccentric to said transverse bores in said second sleeve, retaining means selectably to retain the first sleeve against sliding relative to the rod, and fastening means to retain the abutment surfaces in mutual abutment, the fastening means comprising a pin, which is receivable in said transverse aperture of the rod and transverse bores of said second sleeve respectively and which has an eccentric portion so arranged as to enable the pin — when received in said aperture on being rotated to cause relative displacement of the first sleeve and second sleeve.

7. An assembly according to claim 6, wherein the abutment surface of the second sleeve is provided by an annulus of resiliently yieldable material.

8. An assembly according to claim 7, wherein the annulus is interrupted by at least one recess to enhance the resilience of the annulus.

9. A hitch assembly for hitching a trailer to a towing vehicle, especially to a passenger car, which includes: a rod having a bore through one end portion thereof and comprising a ball forming the other end portion of said rod, mounting means attachable to a towing vehicle and comprising a sleeve open at least at one end for receiving the other end of said rod, said sleeve being axially movable relative to said rod and being provided with axially aligned cylindrical bores extending transverse to the longitudinal axis of said rod and eccentrically offset with regard to said bore in said one end portion of said rod while communicating therewith, said sleeve and said rod being respectively provided with mutually complementary abutment means for engagement with each other, fastening means for retaining said mutually complementary abutment means in engagement with each other, said fastening means including an eccentric bolt journaled in said cylindrical bores of said sleeve and having a cylindrical portion essentric with regard to the bolt portions journaled in said cylindrical portions of said sleeve and journaled in said eccentric bore of said rod, said bolt being rotatable to cause relative displacement of said rod and said sleeve for selectively clamping the same against each other along said abutment means, and adjusting means to adjust at least one of the abutment means in a direction parallel to the longitudinal axis of the rod.

10. An assembly according to claim 9, wherein the adjusting means comprise mutually cooperable screw threads provided respectively on an adjustment member having said one abutment surface provided thereon and on a main body portion of the rod.

11. An assembly according to claim 9, wherein the adjusting means comprise mutually cooperable screw threads provided respectively on an adjustment member having said one abutment surface provided thereon and on a main body portion of the sleeve.

* * * * *